Nov. 25, 1924.

A. F. MASURY ET AL 1,517,239

COMPRESSION RESILIENT TIRE

Filed March 20, 1923

INVENTORS
Alfred F. Masury
August H. Leipert
BY
Redding Greeley O'Shea Campbell
ATTORNEYS.

Patented Nov. 25, 1924.

1,517,239

UNITED STATES PATENT OFFICE.

ALFRED FELLOWS MASURY AND AUGUST HARRY LEIPERT, OF NEW YORK, N. Y., ASSIGNORS TO INTERNATIONAL MOTOR COMPANY, OF NEW YORK, N. Y., A CORPORATION OF DELAWARE.

COMPRESSION RESILIENT TIRE.

Application filed March 20, 1923. Serial No. 626,420.

*To all whom it may concern:*

Be it known that we, ALFRED FELLOWS MASURY and AUGUST H. LEIPERT, citizens of the United States, residing, respectively, in the borough of Manhattan and the borough of Queens of the city of New York, in the State of New York, have invented certain new and useful Improvements in Compression Resilient Tires, of which the following is a specification, reference being had to the accompanying drawing, forming a part hereof.

This invention relates to tires of non-metallic resilient material such as rubber which may be used for vehicles in the ordinary way but which by reason of their construction possess certain inherent advantages over known tires. More particularly, the invention is concerned with non-pneumatic tires which shall have a greater degree of resiliency than has been heretofore obtained and materially greater life.

Non-pneumatic tires as heretofore constructed are necessarily made of comparatively dense rubber hardened to the greatest possible degree consistent with some degree of resiliency for improving the riding qualities of the vehicle to which they are attached. The compound as thus formed is given as long life as can be by known methods of compounding and yet the very properties which tend to increase the life of known non-pneumatic tires also tend to decrease their resiliency.

It is the principal object of the present invention, therefore, to provide a non-pneumatic tire in which the rubber compound may be of such composition as to afford a substantial degree of resiliency and shall be so mounted mechanically as to store up considerable energy in its mass and, at the same time, materially increase its life. These and other desirable results are secured by confining more or less of the entire mass of the rubber entering into the tire construction, under compression, such confinement being provided with particular reference to the tread of the tire so that the advantageous results will be secured to the greatest possible degree at the section where shocks are to be cushioned by direct impact and disintegrating blows are to be met. The actual confinement of more or less of the mass of rubber entering into the tire construction may be accomplished by different mechanical means by one skilled in the art but there has been illustrated in the drawings accompanying this specification, by way of example, two such general means, in one of which non-metallic confining devices are employed and in the other of which metallic devices are provided. The scope of the invention will appear at greater length hereinafter. Reference is now to be had to the accompanying drawings, wherein:

Figure 1:
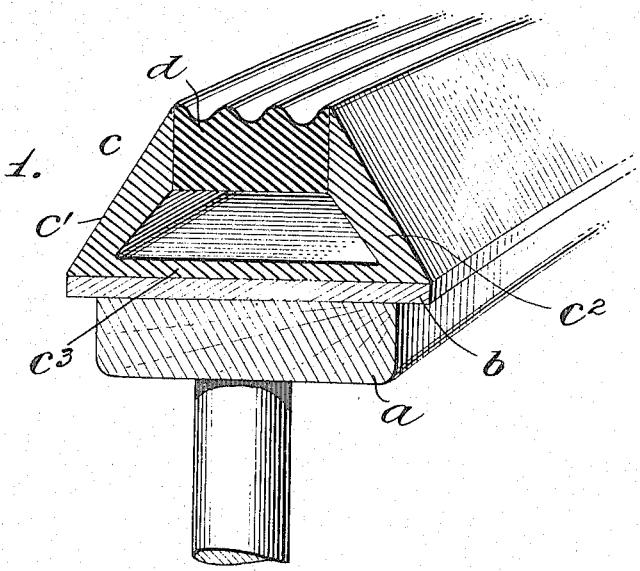
Figure 1 is a view partly in section and partly in perspective through a tire embodying the improvements.

It is to be understood that the invention is not to be limited to the particular form which the cross section of the tire takes nor to the means by which it is mounted on the wheel. As shown in Figure 1, for instance, the felloe $a$ carries thereon a rim $b$ to which is secured the improved tire indicated generally at $c$ which is preferably non-pneumatic although when the construction is fully understood it will be appreciated that the invention is not to be avoided by merely inserting an inner tube within a shoe embodying the improvements. In this form the tire is hollow having two opposed inclined side walls $c'$, $c^2$, of comparatively heavy dense rubber which may be moulded integral with the base $c^3$. The load on the vehicle obviously tends to cause the side walls $c'$, $c^2$ to collapse. Interposed between them is an independent section $d$ of resilient non-metallic material, such as rubber, which constitutes the tread portion proper and may have its external surface of any desired configuration. This section of the tire is accordingly subject always to compression by the load and other stresses transmitted thereto. It has been found in practice that the life of rubber may be materially increased by confining it under compression without relying upon changes in its composition such as would affect its resilient properties. Accordingly, the tread section $d$ by the construction proposed in Figure 1 will be found to have greater resiliency than has heretofore been obtainable in non-pneumatic tires and have greater life than is obtainable through the compound.

Figure 2:
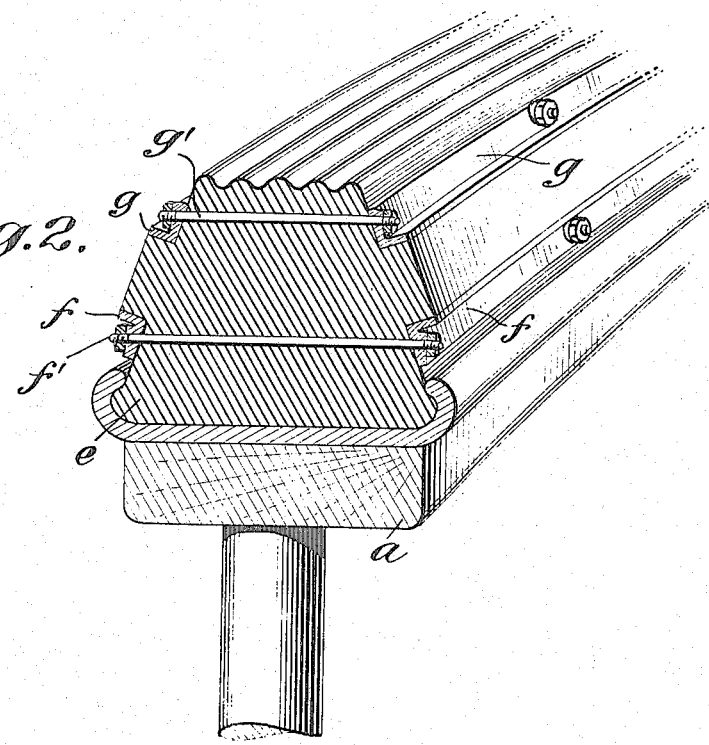
Figure 2 is a view similar generally to Figure 1 but showing other devices for confining the rubber under compression and also a somewhat different cross-sectional form of tire.

In Figure 2 the same results are secured by placing the entire mass of rubber in a solid rubber tire $e$ under compression through mechanical devices. As shown, annular rings $f$, $g$, of angular form are placed at opposite sides of the rubber tire $e$ and bolted through as by bolts $f'$, $g'$, respectively. Opposed rings are drawn together to any desired degree so as to place the intervening mass of rubber under compression and so confine it. The result, as heretofore pointed out, is an added degree of resiliency coupled with greater strength and longer life.

Other ways of submitting the tread portion or the complete tire to compressive forces may suggest themselves without avoiding the principle on which the appended claims rest.

What we claim is:

1. A solid vehicle tire of non-metallic material having a rim securing portion, annular retaining members disposed adjacent the rim securing portion upon opposite sides of the tire, through bolts connecting the annular members, annular retaining members adjacent the tread portion, and through bolts connecting said last named members to maintain the tread always under compression.

2. A solid vehicle tire of non-metallic material having a rim securing portion and formed with sides converging to a tread portion, opposed shoulders formed on opposite sides of the tire respectively, pairs of annular members L-shaped in cross section upon opposite sides of the tire, said pairs engaging the respective shoulders, one of said pairs of annular members being adjacent the rim securing portion and the other of said pairs of annular members adjacent the tread, and means to maintain said annular members in clamping engagement with the tire.

This specification signed this 16 day of March A. D. 1923.

ALFRED FELLOWS MASURY.
AUGUST HARRY LEIPERT.